UNITED STATES PATENT OFFICE.

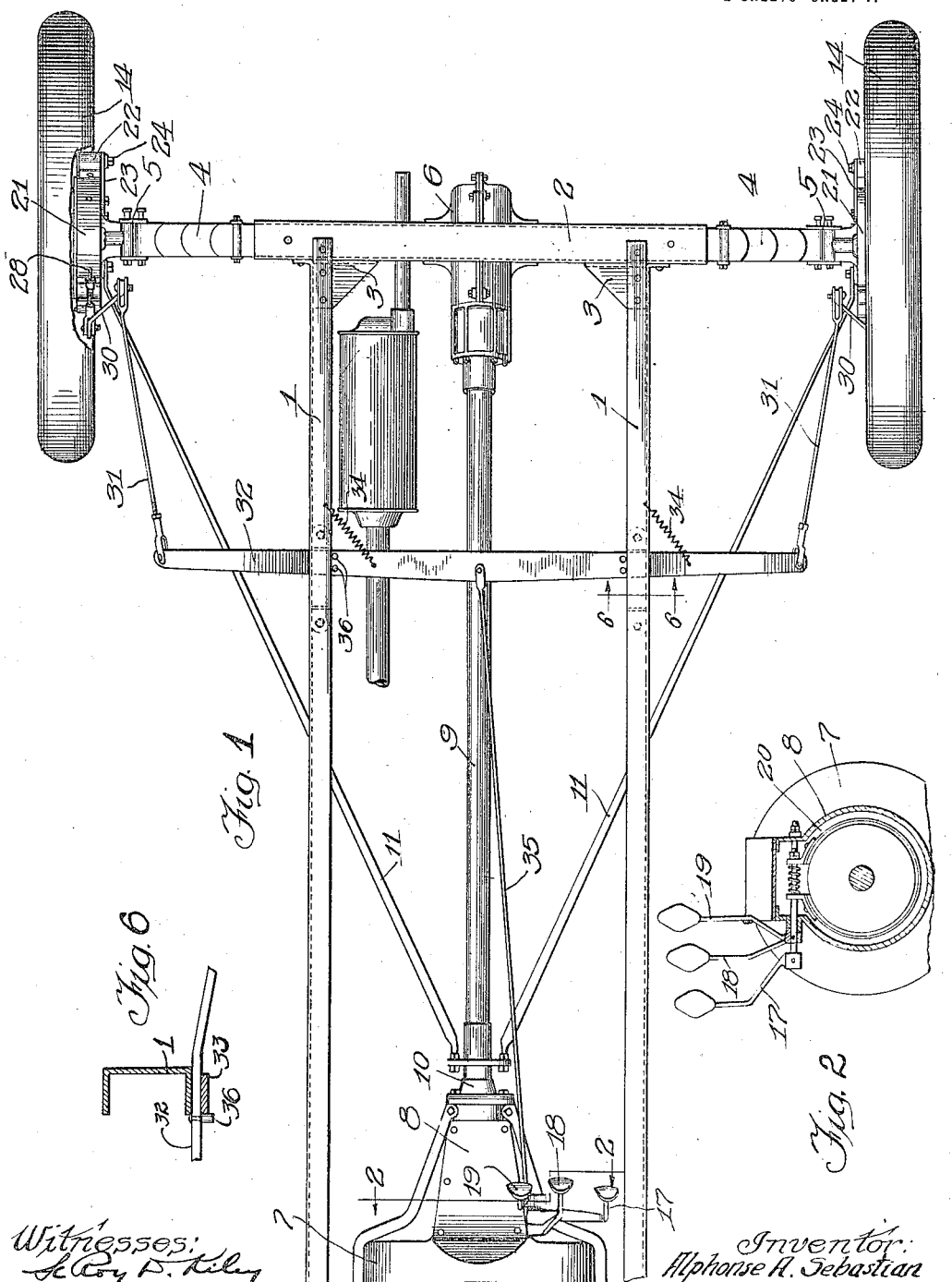

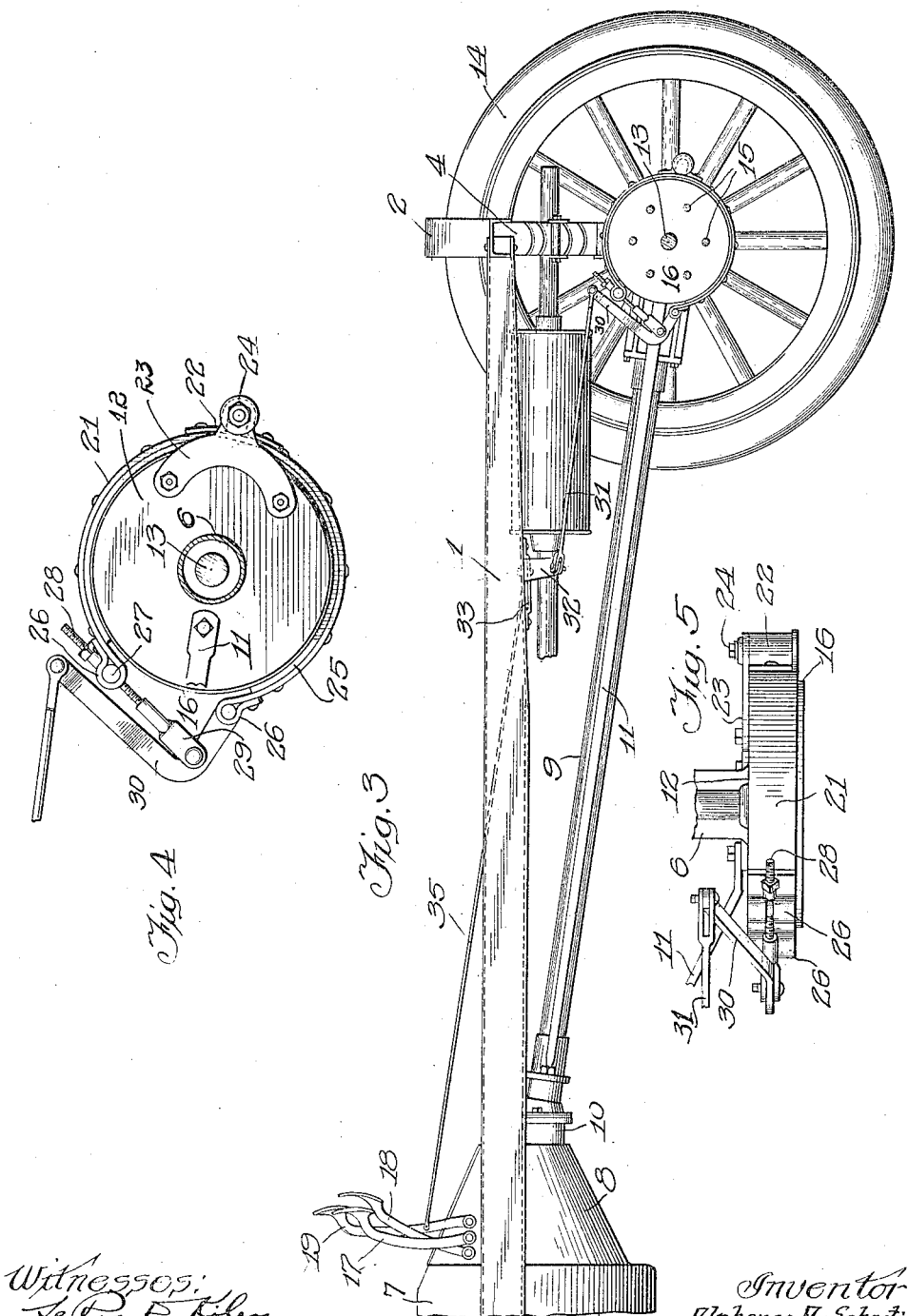

ALPHONSE A. SEBASTIAN AND DELBERT R. CAPES, OF CHICAGO, ILLINOIS, ASSIGNORS, BY DIRECT AND MESNE ASSIGNMENTS, TO A.-C. MANUFACTURING COMPANY, OF CHICAGO, ILLINOIS, A CORPORATION OF ILLINOIS.

MOTOR-CAR REAR-WHEEL-BRAKE MECHANISM.

1,348,452.           Specification of Letters Patent.       Patented Aug. 3, 1920.

Application filed March 10, 1916. Serial No. 83,265.

*To all whom it may concern:*

Be it known that we, ALPHONSE A. SEBASTIAN and DELBERT R. CAPES, citizens of the United States, and residents of the city of Chicago, in the county of Cook and State of Illinois, have invented certain new and useful Improvements in a Motor-Car Rear-Wheel-Brake Mechanism; and we do hereby declare that the following is a full, clear, and exact description of the same, reference being had to the accompanying drawings, and to the numerals of reference marked thereon, which form a part of this specification.

The ordinary stock Ford car, as well known, is provided with a transmission foot or service brake, and an emergency brake which operates on the rear wheels of the car. The objection to a transmission service brake is that in stopping the car the braking stress is transmitted through the propeller shaft, differential and axle sections to the wheels keyed thereon, and as a result a jerky and inefficient braking effect is gained, especially if any play or looseness exists between the mechanisms connected between the transmission and the rear wheels of the car.

This invention relates to a simple attachment for Ford cars wherein the brake drums for the emergency brake secured upon the rear wheels of the car are utilized in attaching rear wheel service brakes for actuation by the same foot pedal usually provided for operating the transmission brake, although preferably the transmission brake band is loosened so as not to operate when our improved attachment is associated with the car.

It is an object therefore of this invention to provide a service brake construction for adaptation to the rear wheels of a Ford car which may be interconnected for actuation by the usual transmission brake pedal provided on the car.

It is also an object of this invention to construct a service brake attachment comprising bands adapted to be supported upon the ends of the axle housing of a Ford car to extend around the exterior of the emergency brake drums provided, and actuatable through an equalizing bar by the usual transmission brake pedal provided on the car.

It is furthermore an important object of this invention to construct an equalizing brake mechanism embracing bands disposed about the exterior of the emergency brake drums usually provided on the rear wheels of a Ford car and actuatable by the foot pedal provided to operate the usual transmission brake band.

It is finally an object of this invention to construct a service brake for Ford cars adapted to be readily attached thereto and actuated by the usual brake pedal provided for the purpose to brake directly upon the rear wheels of the car.

The invention (in a preferred form) is illustrated in the drawings and hereinafter more fully described.

In the drawings:

Figure 1 is a fragmentary top plan view of the rear end of a Ford chassis with parts omitted and parts broken away, illustrating a service brake embodying the principles of our invention associated therewith.

Fig. 2 is a detail section taken on line 2—2 of Fig. 1, with parts omitted and parts shown in elevation.

Fig. 3 is a fragmentary side elevation of the rear portion of a Ford chassis with parts broken away and shown in section.

Fig. 4 is an enlarged detail with parts in section, illustrating a brake band upon one of the brake drums.

Fig. 5 is a top plan view of the mechanism shown in Fig. 4.

Fig. 6 is a section on line 6—6 of Fig. 1.

As shown in the drawings:

The reference numerals 1, indicate the side channel sills of a Ford chassis, which are connected at their rear ends by an arched cross frame member 2, reinforced by gusset plates 3, and connected centrally beneath said arched member 2, is the usual semi-elliptic spring 4. The ends of the spring 4, are connected by means of shackles 5, to the ends of the rear axle housing, denoted by the reference numeral 6, whereby the chassis is supported upon the rear axle housing through the spring 4. A portion of the unit power plant of the car is shown fragmentarily in Figs. 1 and 3, designated as a whole by the reference numeral 7, and forming a part of the rear end thereof is a planetary transmission housing 8. A tubular drive shaft housing 9, extends from the transmission housing 8, to the differential housing on the rear axle, the same being connected through a suitable ball and socket joint 10, at the transmission housing 8. Secured to the connection 10, are radius rods 11, which extend rearwardly in divergent relation and are connected to the disk shaped or circular ends 12, of the axle housing 6. Keyed upon the outer ends of the axle sections within the axle housing 6, one of which is shown in section in Figs. 3 and 4, denoted by the reference numeral 13, are rear wheels 14, and bolted to the spokes of said rear wheels by means of bolts 15, are brake drums 16.

Pivotally mounted on the exterior of the transmission housing 8, are three control pedals 17, 18, and 19, respectively, of which the pedal 19, is connected to tension a brake band 20, within the transmission of the car. The brakes themselves for the rear wheels each comprises a band of metal 21, which, at its central exterior portion, is provided with an apertured supporting lug 22, riveted thereon, and a plate or bar 23, is riveted or bolted to the disk member 12, at the end of the axle housing to support said brake band by means of a pivot bolt 24, extending through said bracket bar and said apertured lug. Riveted or secured in any suitable manner upon the interior surface of the metal brake band 21, is a brake lining material 25.

Eyes 26, are formed at each end of the brake band 21, and threaded through a pivot bolt or stud 27, in the upper eye 26, is an adjusting bolt 28, provided at its lower end with a yoke 29, within which is pivoted a bent lever or crank 30. The lower end of said lever 30, is pivoted in the other eye 26, of the brake band, and it is clearly obvious by reference to Fig. 4, that a forward pull upon the lever 30, away from the brake band will serve to draw the respective eyes 26, of the band toward one another, thus contracting the band upon the brake drum 16. Connected to the upper end of each of the levers 30, are rods 31, which are in turn connected to the ends of an equalizing bar 32, which is mounted transversely and slidably beneath the chassis sills 1, supported in bracket bars 33, for the purpose, riveted on the under surface of said sills 1. A pair of tension springs 34, is provided, connected to the chassis sills 1, and to the equalizing bar 32, in the manner shown in Fig. 1, that is, tending to draw the equalizing bar rearwardly to move the brake bands to the release position. Said equalizing bar 32, is connected at its middle for actuation by a rod 35, which, as clearly shown, is pivotally connected to the usual brake pedal 19, provided on the car. The equalizing bar 32, is guided in its movement beneath the chassis sills by pins 36, secured therein as shown in Figs. 1 and 6, which slide along the inner edges of the bracket bars 33.

The operation is as follows:

The stock type of Ford car is provided with brake drums 16, on the rear wheels thereof within the interior of which are the emergency brake bands (not shown). The service brake, as described, consists of the band 20, on one of the transmission elements, actuatable by a foot lever 19. The attachment of our type of brake to the car requires no alteration in the structure of the car mechanism, although as a general rule the transmission brake band 20, is loosened so as to be entirely out of operation at all times. The brake drums provided on the car are utilized by mounting the brake bands 21, around the exterior surface thereof. The brake bands are actuatable to clamping engagement around the exterior of the drum by an outward pull upon the brake levers 30, received from pull rods 31, attached to the equalizing bar 32, which is in turn pulled forwardly by the rod 35, connected to the usual brake pedal 19.

Owing to the fact that the rod 35, exerts a slightly transverse pull upon the equalizing bar 32, due to its angled connection therewith, the resisting tension springs 34, are connected at an angle between the equalizing bar 32, and the chassis sills 1, as clearly shown in the plan view in Fig. 1, to compensate for the angularity of pull thereon.

We are aware that various details of construction may be varied through a wide range without departing from the principles of this invention, and we therefore do not purpose limiting the patent granted otherwise than necessitated by the prior art.

We claim as our invention:

A motor car brake mechanism, comprising brake bands disposed around the wheel drums of the car, an equalizing bar slidably mounted on the chassis sills, means connecting said bar with said brake bands, a rod pivoted centrally to said bar and adapted to actuate the same to apply said brake bands, a pedal to which the other end of said bar is connected and disposed at an angle to the point of connection of said rod with said bar, and springs connected at an angle between said bar on each side of its point of connection with said rod and to the chassis of the motor car and adapted automatically to return said bar to normal position and thereby release said brake bands.

In testimony whereof we have hereunto subscribed our names in the presence of two subscribing witnesses.

ALPHONSE A. SEBASTIAN.
DELBERT R. CAPES.

Witnesses:
CHARLES W. HILLS, Jr.,
EARL M. HARDINE.